Patented Oct. 2, 1934

1,975,582

UNITED STATES PATENT OFFICE 1,975,582

PREPARING LUBRICATING GREASES

Edwin N. Klemgard, Martinez, Calif., assignor, by mesne assignments, to Shell Development Company, San Francisco, Calif., a corporation of Delaware No Drawing. Application July 28, 1930, Serial No. 471,428

6 Claims. (Cl. 87—9)

This invention relates to the preparation of lubricating greases and consists in the additional step of compounding with the grease certain amounts of rubber latex, giving a product that is adapted particularly for use in conjunction with bearings carrying heavy loads and subjected to reciprocating forces or repeated shock. The object of my invention is to produce a grease of greater stability, with a more tenacious texture and having a greater quality of adhesion to metallic surfaces.

The present practice in the commercial manufacture of consistent lubricating greases is to produce various homogeneous mixtures and combinations of sodium, calcium, aluminum, zinc, and lead salts of the fatty acids with hydrocarbon oils. One of the greatest troubles attendant on mixtures so produced is their unstable character and the tendency of the metallic soap and oil phases to separate. If a sample of most any one of these greases is quietly set aside for awhile this separation is quite evident, usually little pools of free oil having collected around the edges or in any depressions of the sample. On working the sample this separation process goes on more rapidly, being at its maximum for extreme mechanical agitation.

I have found that the addition of small amounts of rubber latex will, in all cases, very greatly retard this action and in a number of instances has practically stopped it. In making stability tests I have experimented extensively with two greases of the following composition, both containing naphthene base pale oil of 300 seconds Saybolt viscosity at 100° F.,

| Mixture | I | II |
|---|---|---|
| | Percent | Percent |
| Aluminum stearate | 9.5 | 9.5 |
| Rubber latex | 0 | .5 |
| 300 pale oil | 90.5 | 90.0 |

The grease containing the rubber latex was found to be considerably more stable under all conditions. Both were subjected to prolonged mechanical agitation after which they were very carefully examined with the following results: Mixture I showed positive separation and signs of breaking down while the texture of Mixture II was practically unchanged. After continual standing without agitation a sample of grease containing rubber latex showed absolutely no oil separation while free oil was quite perceptible in the sample containing no rubber. By these and other tests and indications I have conclusively proved the increased stability due to the effect of the rubber hydrocarbon. By the addition of rubber latex a stable gel structure is formed that is very resistent to separation usually produced by mechanical working or agitation. The product being so stable, it is very superior when compounded as a semi-fluid grease, for use with gears, wheels, ball and roller bearings.

It has been known before to add rubber to hydrocarbon oils for different purposes. However, the process of incorporating the rubber with the oil presents many practical difficulties and the methods employed are usually quite involved and cumbersome. Further, it is very difficult to obtain a homogeneous mixing of the rubber and the grease. I have found that this incorporating of the rubber with a lubricating grease is easily accomplished if, instead of dry rubber, rubber latex is employed.

Rubber latex is a milky fluid consisting mainly of very minute rubber globules dispersed in a watery fluid. The latex often contains beside water and rubber, various constituents as impurities, such as proteins and resinous materials, as well as some anti-coagulent such as ammonia. Latex containing from 30 to 50% by weight of rubber hydrocarbons is preferred and used in this invention, although stronger or weaker dispersions may be employed.

In carrying out the process of my invention in manufacturing a lubricating grease with an aluminum stearate soap as described above, the usual type of steam jacketed compounding kettle may be used with success although it would be possible to dissolve the materials in the oil in a still or other heated receptacle without the means of strong mechanical agitation. About one third of the oil is placed in the compounding kettle, the aluminum stearate added and mixture stirred to obtain suspension of the stearate in the oil. The rubber latex in liquid form is then added to the contents of the kettle and heating started. Heating is continued until substantially all of the water originally present in the latex and the aluminum stearate is evaporated, which will require temperatures of 150 to 250° F. when naphthene base oil is used. Where the percentage of aluminum stearate is above about 15% of the mixture or when making use of oils of paraffine base, higher temperatures ranging from 250° F. to 500° F. may be required in order to dissolve the soap and to obtain a satisfactory yield of a transparent homogenous material. It is preferred to draw the hot, liquid grease into pans to cool in a layer of from two to eight inches in thickness. However, it is also possible to cool the material in the mixer with satisfactory results, particularly so if the jacket of the kettle is provided with water or an air blast to facilitate the rate of cooling. Small containers may be filled with the hot mixture directly from the mixing kettle. The process of manufacturing is considered complete when the grease has been cooled to a temperature below about 110° F.

Other soaps may be used as sodium, lead or calcium soaps. It is preferred to add the rubber latex after the soap base has been made, and before all the mineral oil has been mixed with it. This procedure is of advantage for the reason that the water in the latex is more readily evaporated in the presence of a small bulk of oil.

My invention can be used not only in the preparation of the general range of consistent lubricating greases but also for preparing very dense greases, containing as much as 60% metallic soap and as much as 5% of rubber latex, and so called "compounded oils" or "liquid greases" with less than 1% of soap and less than 0.5% of rubber latex.

As mentioned above, the greases prepared according to the process of my invention show superior qualities, and one of the main reasons why they have not come into general use earlier has been the lack of a satisfactory method of incorporating the rubber.

I claim as my invention:

1. The process for the manufacture of lubricating grease comprising mixing less than 5% of rubber latex with a metallic salt of a fatty acid derived from vegetable oils or fats and a hydrocarbon oil, heating the mixture with suitable agitation to temperatures ranging from 150 to 500° F. and subsequently cooling.

2. The process for the manufacture of lubricating grease comprising mixing less than 5% of rubber latex with less than 15% of a metallic salt of a fatty acid derived from vegetable oils or fats and a naphthene base mineral oil, heating the mixture with suitable agitation to temperatures ranging from 150 to 250° F. and subsequently cooling.

3. The process for the manufacture of lubricating grease comprising the mixing of .05 to 5% of rubber latex with a metallic salt of a fatty acid derived from vegetable oils or fats and a hydrocarbon oil, heating the mixture with suitable agitation to a temperature between 150° F. and 500° F. which is just sufficient to dehydrate the latex and produce a transparent homogeneous texture, and subsequently cooling.

4. The process for the manufacture of a lubricating grease comprising mixing .5% of rubber latex with 9.5% aluminum stearate and 90% hydrocarbon oil, heating the mixture with suitable agitation to a temperature between 150° F. and 500° F. which is just sufficient to dehydrate the latex and produce a transparent homogeneous texture, and subsequently cooling.

5. The process for the manufacture of lubricating grease comprising mixing less than 5% of rubber latex with a metallic soap and a part of the hydrocarbon oil intended to be used for the grease, heating the mixture between 150° F. and 500° F., subsequently adding the balance of the oil and cooling.

6. The process for the manufacture of a liquid lubricant comprising mixing less than .5% rubber latex with less than 1% aluminum stearate, and hydrocarbon oil, heating the mixture with suitable agitation to the lowest temperature below 250° F. sufficient to produce homogeneity and subsequently cooling.

EDWIN N. KLEMGARD.